United States Patent
Adelman et al.

[11] Patent Number: 5,942,595
[45] Date of Patent: Aug. 24, 1999

[54] PROCESS FOR CO-POLYMERIZATION OF FORMALDEHYDE WITH CYCLIC ETHERS IN THE PRESENCE OF ORGANIC NITRO COMPOUNDS

[75] Inventors: Douglas John Adelman; Richard Beckerbauer, both of Wilmington, Del.

[73] Assignee: E. I. du Pont de Nemours and Company, Wilmington, Del.

[21] Appl. No.: 09/114,450

[22] Filed: Jul. 13, 1998

Related U.S. Application Data

[60] Provisional application No. 60/056,187, Aug. 19, 1997.

[51] Int. Cl.⁶ .......................................................... C08G 4/00
[52] U.S. Cl. .......................... 528/241; 528/243; 528/249; 528/250; 528/405; 528/416; 528/421
[58] Field of Search .................................. 528/241, 243, 528/249, 250, 405, 416, 421

[56] References Cited

U.S. PATENT DOCUMENTS

| | | | |
|---|---|---|---|
| 3,376,361 | 4/1968 | Halek et al. | 260/823 |
| 3,803,094 | 4/1974 | Ishii et al. | 260/67 FP |
| 4,151,346 | 4/1979 | Sextro et al. | 528/230 |
| 4,312,977 | 1/1982 | Jones et al. | 528/241 |
| 4,937,312 | 6/1990 | Collins et al. | 528/230 |

FOREIGN PATENT DOCUMENTS

| | | |
|---|---|---|
| 864041 | 2/1971 | Canada . |
| 0 308 187 | 3/1989 | European Pat. Off. . |
| 1500156 | 9/1967 | France . |
| 19 06 848 | 9/1969 | Germany . |
| 45-18309 | 6/1970 | Japan . |
| 48-877 | 1/1973 | Japan . |

OTHER PUBLICATIONS

K. Burg et al., *Makro. Chem.*, 142, 247, 1971.
S.A. Vol'fson et al., *Dokl. Akad. Navk. SSR*, 234, 1365, 1977.
R.S. Jones, *Polym. Preprints*, 21, 144, 1980.
Yamashita et al., *J. Polymer Sci.*, A2, 4, 2121–2135, 1966.
N.F. Kedrina et al., *Science*, 33, 799–804, 1991.
Chemical Abstracts, vol. 83, No. 20, Nov. 17, 1975, XP–002086001, Droescher M. et al., Synthesis and properties of completely crystalline polyoxymethylene copolymers, p. 3.

*Primary Examiner*—Samuel A. Acquah

[57] ABSTRACT

Disclosed is a process for copolymerization of formaldehyde with cyclic ethers in the presence of organic nitro compounds. The process enhances the selectivity for the cyclic copolymer.

13 Claims, 2 Drawing Sheets

PROCESS FOR CO-POLYMERIZATION OF FORMALDEHYDE WITH CYCLIC ETHERS IN THE PRESENCE OF ORGANIC NITRO COMPOUNDS

This application claims priority benefit of U.S. Provisional Application No. 60/056,187, filed Aug. 19, 1997.

FIELD OF INVENTION

This invention relates to a process for the copolymerization of formaldehyde with cyclic ethers. In particular, the invention relates to a process for enhancement in the selectivity for the cyclic comonomer of the $BF_3$-etherate-initiated reaction, in the presence of organic nitro compounds.

BACKGROUND OF THE INVENTION

It is known in the art that the copolymerization of cyclic ethers, notably dioxolane and ethylene oxide with formaldehyde, forms polyoxymethylene copolymers with improved thermal and base stability compared to those of polyoxymethylene homopolymer. For most applications, the desired composition range comprises ca. 0.5 to 2.5 mole % of comonomers; enough to provide stability but not so much as to degrade physical and mechanical properties beyond the point of function in most acetal applications. In performing the research which led to the present invention, the inventors discovered that the cyclic ether concentration in the hydrocarbon reaction medium had to be in the range of 0.5–1.0 M in order to achieve comonomer concentration in the copolymer of 0.5–2.5 mol-%. Dioxolane concentrations of that magnitude in the solvent represent a disposal or recycle problem. In addition, with dioxolane there is formation of an unwanted side product—trioxepane to equilibrium levels of 0.3–2% by weight (0.02–0.15 M). The equilibrium concentration of the trioxepane is directly proportional to the dioxolane concentration in the solvent. The present invention avoids the recycle problem by improving the rate of cyclic ether, e.g., dioxolane, incorporation into the polymer by the addition of organic nitro compounds into the reaction. The process thus enhances the selectivity for the cyclic comonomer.

Most common polyoxymethylene copolymerizations use 1,3,5-trioxane and dioxolane as comonomers and Lewis acid initiators. Copolymerization of formaldehyde with cyclic ethers is less common. Polyoxymethylene can be produced from anhydrous formaldehyde anionically, via a reversible polymerization effected in a hydrocarbon slurry. The low solubility of formaldehyde in hydrocarbons and the formation of highly crystalline, insoluble polymer particles drive the equilibrium to both high conversion and high molecular weight. Under cationic catalysis, cyclic ether comonomers can copolymerize with formaldehyde in the hydrocarbon slurry process.

French Patent 1,500,156, assigned to British Industrial Plastics Ltd., issued in 1967, discloses the copolymerization of trioxane and dioxolane initiated by a solution of arsenic pentafluoride initiators in nitro-substituted hydrocarbon solvents. The total concentration of nitro compounds in the reaction mixture is well under 1%.

Usa et al, Japanese Patent Application SHO 48-877, published in 1973, disclose copolymerization of trioxane and cyclic ethers catalyzed by $P_2O_5$, the entire reaction taking place in nitro-substituted hydrocarbon solutions such as nitrobenzene and nitromethane.

C. Chen, Canadian Patent 864041, issued 1971, discloses copolymerization of trioxane and dioxolane to molecular weights up to 500M by addition of $CH_2Cl_2$ "enhancing agent". It is explicitly stated that nitrobenzene prevents reaction. Preferred initiators include triphenyl, and trimethoxyphenyl carbonium, and trialkyl oxonium salts of $PF_6$ and $AsF_6$.

K. Burg et al, Makro. Chem. 142, 247 (1971) disclose the copolymerization of trioxane and dioxolane with, among others, $BF_3$ etherate initiator. They state explicitly that the incorporated fraction of dioxolane corresponds to the monomer ratio of trioxane to dioxolane.

S. A. Vol'fson et al, Dokl. Akad. Nauk. SSR, 234, 1365 (1977) disclose the copolymerization of HCHO and dioxolane at elevated pressure in ethyl benzene solution, initiated by, among others, $BF_3$ etherate. It is stated explicitly that comonomer incorporation depends upon the concentration of initiator.

R. S. Jones, Polym. Preprints, 21, 144 (1980) discloses copolymerization of HCHO and dioxolane in hydrocarbon slurry initiated by $BF_3$ etherate. It is stated explicitly that comonomer incorporation is dependent upon initiator concentration only and shows that dioxolane incorporation into the copolymer is favored in the least polar solvent, hexane. Jones cites a preferred dioxolane concentration of 0.5 M (5.4 wt %) to achieve 1–2 mole % in the copolymer.

Yamashita et al., (J. Polymer Sci., A2, Vol. 4, p 2121–2135, 1966) states that relative reactivity correlates best with basicity and free energy. Copolymerizations involving dioxolane show only small changes in reactivity ratios with change in initiator or reaction medium which ranged from toluene to nitrobenzene. Even in carbocationic copolymerization of trioxane, where much more data exists and reactivity ratios are significantly affected by solvent and catalyst, they state, "a systematic interpretation is difficult even in the simplest cases".

The copolymerization of formaldehyde and dioxolane is further complicated by the heterogeneous nature of the polymerization where the reactive sites reside on or near the surface of the crystalline, insoluble particles.

The art, in general, teaches away from employing nitro-substituted hydrocarbons. Burg, Vol'fson, and Jones all teach that comonomer incorporation depends only upon catalyst concentration or monomer ratio. While not mutually consistent, all seem to exclude the benefit of any additive to enhance the comonomer incorporation. Chen does teach the benefit of an enhancing agent, but the agent is $CH_2Cl_2$, the initiators do not include $BF_3$ etherate, the reaction involves trioxane not HCHO, and, most importantly, Chen explicitly states that nitrobenzene prevents reaction.

SUMMARY OF THE INVENTION

This invention provides for a process for the copolymerization of anhydrous formaldehyde with cyclic ethers, the process comprising combining anhydrous formaldehyde with a slurry comprising particles of polyoxymethylene polymer or copolymer suspended in a hydrocarbon solvent having dissolved within it:

(I) one or more cyclic ethers in a concentration range of about 0.05 to 1.0 molar; and (II) one or more organic nitro compounds in a concentration range of about 0.06 to 1.2 molar, in the presence of $BF_3$-etherate initiator.

BRIEF DESCRIPTION OF THE DRAWINGS

The drawings show the two baffled glass reactors in which the polymerizations herein described were carried out. Both reactors were equipped with mechanical stirrers and entry and sampling ports.

DETAILED DESCRIPTION OF THE INVENTION

Figure 1:
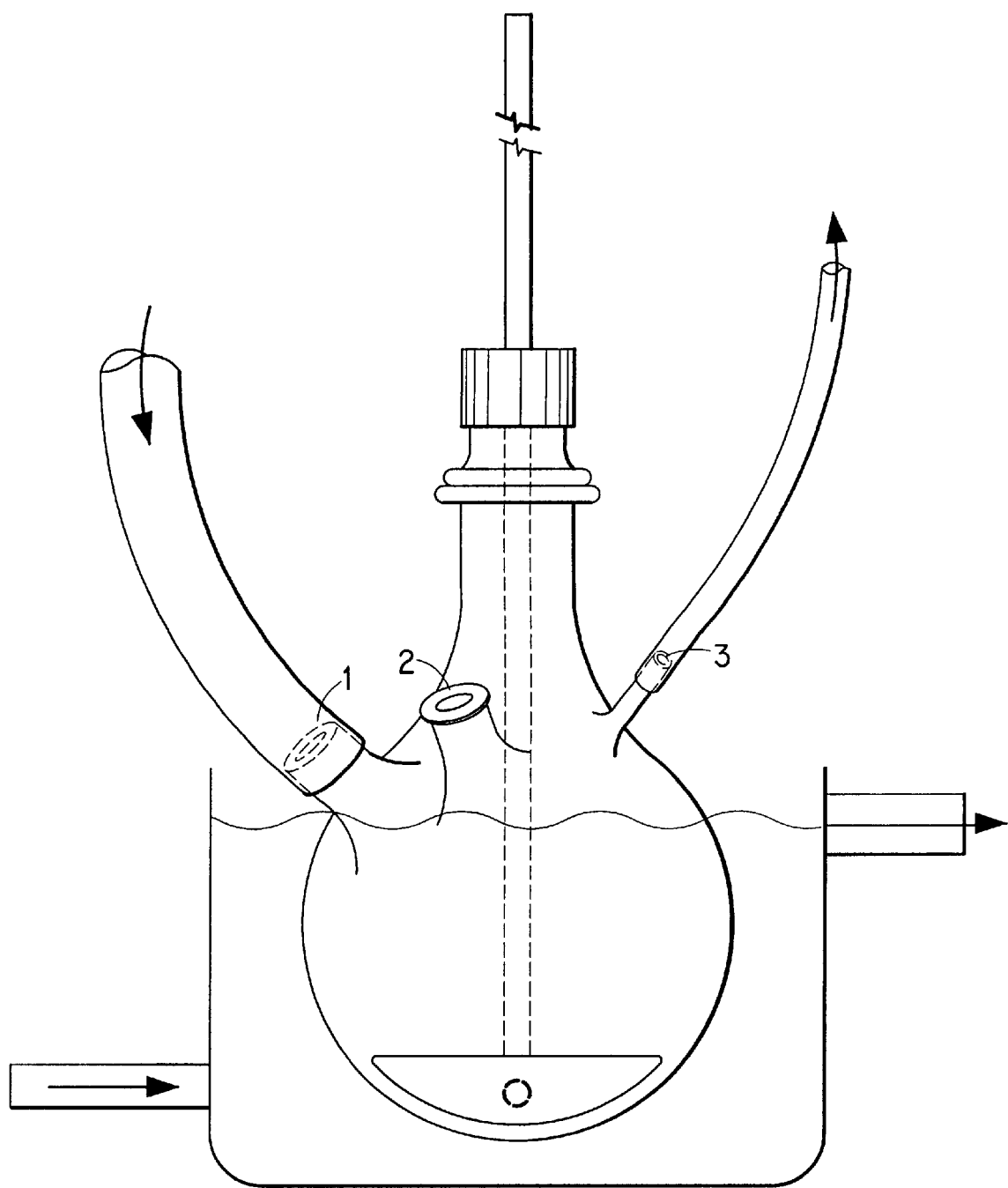
FIG. 1 shows a baffled 250 ml glass reactor immersed in a circulating water bath.

In a preferred embodiment of the process of the invention, anhydrous formaldehyde, having a maximum protonic impurity content of 600 ppm by volume, preferably 300 ppm by volume, is fed continuously from the gas phase into a hydrocarbon slurry at a temperature in the range of 30 to 80° C., preferably 50 to 70° C. The hydrocarbon slurry comprises a suspension of polyoxymethylene or copolymers thereof in a hydrocarbon solvent having dissolved therein dioxolane in the concentration range of 0.05 to 10% (0.05–1.0 M), preferably 1 to 5% by weight (0.1–0.5 M) and 0.5–10% (0.06–1.2 M), preferably 2–6% (0.2–0.7 M) by weight of nitromethane. Percentage by weight is stated as a percentage of the total weight of the hydrocarbon solution. $BF_3$-diethyl or $BF_3$-dibutyl etherate initiator is present in solution in the hydrocarbon at a concentration of 0.5 to 2 mM, preferably 0.8 to 1.2 mM.

The polymer formed in the process of the present invention precipitates to increase the solids content of the slurry during semibatch copolymerizations. During continuous copolymerizations, a portion of the solids formed is separated from the solvent by a filtration apparatus, with the solvent being recycled back to the polymerization unit. The hydrocarbon slurry comprises a suspension of the polyoxymethylene/dioxolane copolymer in a hydrocarbon liquid, preferably hexane, heptane, or cyclohexane. In the practice of this invention, it is found that a slurry comprising 5–40% by weight solids in n-heptane is found to be satisfactory.

It has been observed that in the absence of organic nitro compounds, the dioxolane comonomer concentration in the hydrocarbon reaction medium had to be in the range of 3 to 10% by weight (0.5–1.0 M) in order to achieve comonomer concentration in the copolymer of 0.5–2.5 mol-%. Dioxolane residues and the formation of an unwanted side product—trioxepane to equilibrium levels of 0.3–2% by weight (0.02–0.15 M) results in a recycling problem. The equilibrium concentration of the trioxepane is directly proportional to the dioxolane concentration in the solvent. In the process of the present invention, it is found that addition of 0.06–1.2 M of organic nitro compounds to the $BF_3$ etherate initiated copolymerization in heptane leads to an unexpected enhancement of the dioxolane incorporation into the polymer by 5–10 fold. Organic nitro compounds suitable for the practice of the invention are nitroaliphatic species, including nitromethane, nitroethane, and nitrobutane, and nitrocyclohexane, as well as nitroaromatic species, including nitrobenzene and nitrotoluene. Nitromethane is preferred. Multi-nitro compounds are less preferred because their solubility is undesirably limited in the hydrocarbon solvents suitable for the practice of the present invention. Additionally, multi-nitro compounds may exhibit excessively acidic character leading to undesirable levels of chain transfer during polymerization, limiting polymer molecular weight.

When, for example, nitromethane is added to the reaction mixture hereinabove described at 3.5 wt % (0.38 M), an 8 fold increase in the competitive reactivity of dioxolane with respect to that of formaldehyde was observed. An increase in reaction rate and molecular weight of the polymer produced was also observed to accompany the incorporation of nitromethane into the reaction mixture. Other organic nitro compounds show similar, though weaker, effects.

The concentration of organic nitro compounds in the hydrocarbon reaction medium hereinabove described must be limited to <1.2 M because of the observed deliterious effect on product molecular weight. It is found in the practice of this invention that at concentrations of nitromethane ca. 10% (1.2M) by weight in the solvent, the polymer number average/weight average molecular weight is 20,000/95,000 as determined by gel permeation chromatography using hexafluoroisopropional solvent in the ASTM method D5296-92. This is significantly less than would be obtained in the presence of 3.5% by weight (0.38 M) of nitromethane in the solvent. Organic compounds of polarity similar to that of organic nitro compounds, for example, acetonitrile or dicyano butane, but not containing the nitro group, have not been observed to provide the benefits of the present invention. Some, e.g., dimethylsulfoxide or tetrahydrofuran, kill the reaction.

The present invention is further described in the following specific embodiments.

EXAMPLES

In semibatch copolymerizations, the reactivity ratios can be assessed by comparing the comonomer incorporation with the equilibrium solution concentrations at a set feed ratio. Under these conditions, the effects of additives or other changes can be probed.

Figure 2:
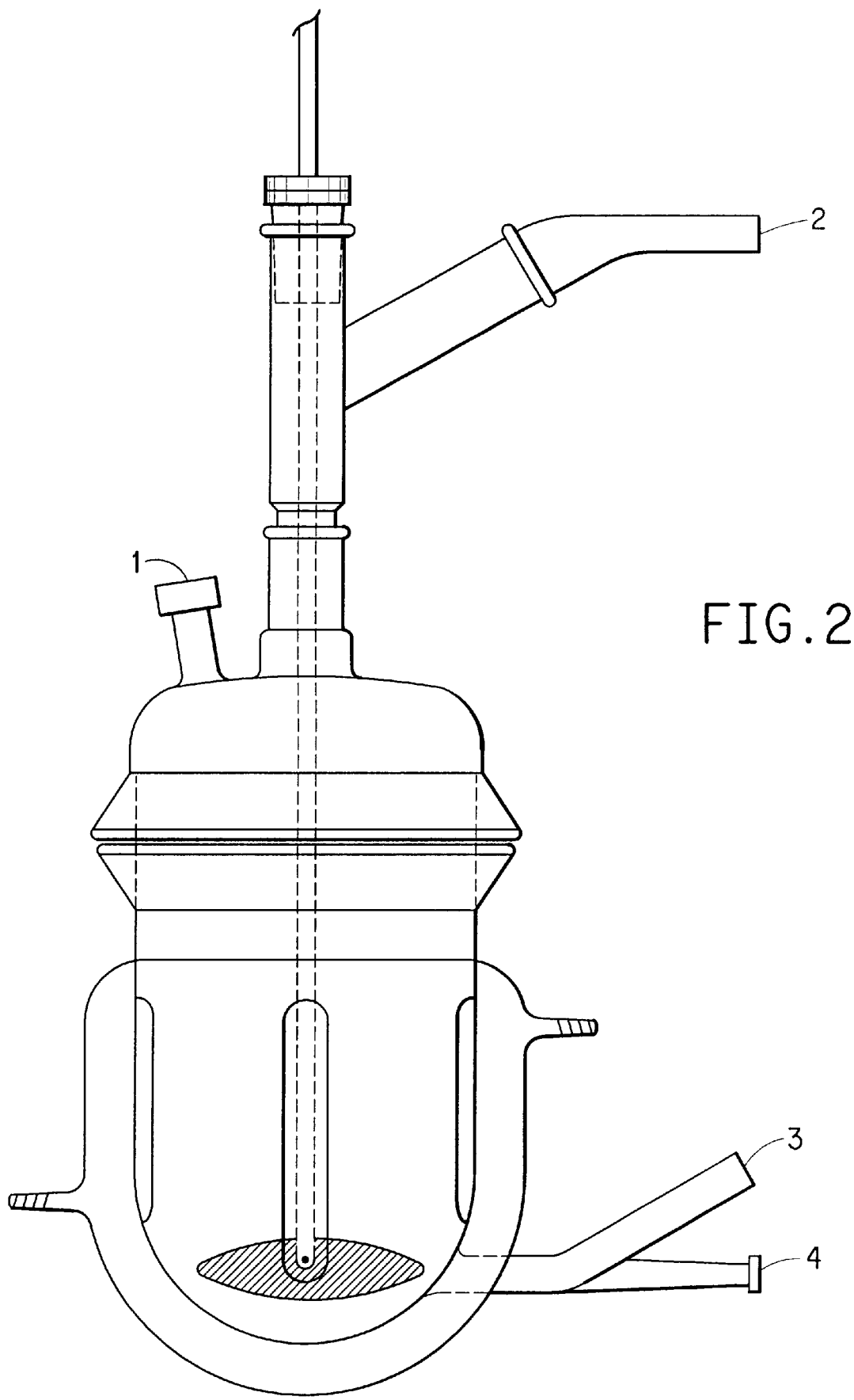
FIG. 2 shows a 800 ml jacketed baffled glass reactor through the jacket of which was passed water to control the temperature of the reactor.

Polymerizations were carried out in baffled glass reactors immersed in a circulating water bath (FIG. 1) or in baffled jacketted glass reactors (FIG. 2). As seen in the schematics, the reactors were equipped with mechanical stirrers and entry and sample ports. In FIG. 1, the formaldehyde entered through port 1 and any excess left via port 3. Solvent, comonomer, organic nitro liquids, and catalyst were added through the septum labeled 2. A thermocouple, used to monitor slurry temperature, was installed through septum 2. Slurry samples were removed via syringe and a large bore needle through septum 2. In FIG. 2, solvent and initial comonomer and organic nitro charges entered through port 1. Excess formaldehyde left via port 2. Formaldehyde entered through port 3. Initial catalyst charge, thermocouple, slurry sample withdrawl, and liquid feeds during the run were done through septum 4. Prior to charging with the reactants, the reactor was dried under vacuum for 18 hours at 135° C. in a model 1430 DuPont oven made by Sheldon Manufacturing, Inc. of Cornelius, Oreg.

Formaldehyde was generated by thermolysis of 2-ethylhexylhemiformal and was determined by GC/MS (ASTM D4128-94 and D260) to contain less than 300 ppm by volume of water and methanol. The formaldehyde so generated was fed to the polymerizer by a peristaltic pump through large bore tubing. The oven-dried reactor was charged under nitrogen with the solvent and dioxolane as hereinbelow indicated. All liquid components, which includes solvent, dioxolane, and organic nitro compounds, were stored over size 4A activated molecular sieves from EM Science and determined by coulometric Karl-Fisher water analysis (ASTM E1064-92) to have the water content indicated hereinbelow. The solvent and dioxolane were heated to a temperature in the range of 40–50° C., the nitrogen purge removed, and formaldehyde introduced.

Formaldehyde was flowed through the reactor for 0.5–1 min, with liquid agitation, followed by introduction of initiator via syringe through the septum port and commencement of dioxolane and organic nitro compound flows using syringe pumps to introduce them into the reactor via 1/16 inch stainless steel tubing through a septum port. In continuous runs wherein polymer was periodically removed, initiator solution and additional solvent were also fed continuously. However, semibatch runs were also made, wherein the only continuous feed streams were the formaldehyde, organic nitro compound, if used, and dioxolane.

The reaction temperature was observed to rapidly increase, at a rate proportional to the rate of reaction.

Small slurry samples were withdrawn periodically. The solids content was determined gravimetrically. The polymer molecular weight was measured by gel permeation chromatography in hexafluoroisopropanol according to ASTM D5296-92. The concentration of comonomer in the polymer was determined by dissolving the copolymer in acetic anhydride containing 2% by volume of sulfuric acid, followed by neutralization of the acid with calcium hydroxide, and then gas chromotographic analysis of the liquid layer to measure the relative amounts of diacetates present. The composition of the liquor collected with each slurry sample was determined using an internal standard method and a centrifuge, when necessary, to give a separate liquid layer. Samples were injected into a gas chromatograph calibrated for the components present in the mixture.

An indication of uniformity of comonomer incorporation in the polymer was obtained from base stability measurements whereby the stable fraction of the polymer was determined after treatment with potassium hydroxide in benzyl alcohol at 160° C., and further from crystalline melting point and heat of fusion determinations using differential scanning calorimetry, ASTM E794-81.

The polymer products, including those from the small slurry samples collected for liquid and polymer analyses, were isolated by filtration, washed with methanol and acetone and dried under vacuum at room temperature.

Example 1

Into a rapidly stirred 1 liter reaction flask containing 102 g of heptane, 1.68 g (1.5 wt %) of dioxolane, 5.10 g (4.7 wt %) of nitromethane, the heptane being saturated with anhydrous formaldehyde at 40.2° C., was added 20 microliters of borontrifluoride diethyletherate. Dioxolane was then introduced continuously at a rate of 0.11 g/min, nitromethane at 0.62 g/min, and formaldehyde on demand. The reaction exotherm peaked at 57° C. (the external bath was adjusted to maintain temperature near 56° C.) and formaldehyde was consumed at an average rate of 1.32 g/min (8.5 g/min/l) over a 12 min. period. The final product was a copolymer containing 2.66 mole % of dioxolane derived units, a number average to weight average molecular weight ratio (Mn/Mw) of 45,900/133,000, a 83.6% base stability and a melting point of 161.6° C. for the base stable fraction. The dioxolane concentration was 0.47 wt % and biproduct trioxane and trioxepane concentrations at the end of the reaction were 0.85 and 0.31 wt %.

Comparative Example 1

Into a rapidly stirred 1 liter reaction flask containing 250 g of heptane having a water content of 3.7 ppm, 12.91 g (4.9 wt %) of dioxolane with 10.0 ppm water, the heptane being saturated with anhydrous formaldehyde at 40° C. was added 45 microliters of borontrifluoride etherate. Dioxolane was then introduced continuously at a rate of 0.17 g/min and formaldehyde was fed on demand. The reaction exotherm peaked at 46.5° C. and formaldehyde was consumed at an average rate of 1.26 g/min (3.0 g/min/l) over a 30 min period. The final product was a copolymer containing 1.45 mole % of dioxolane derived units, an Mn/Mw ratio of 41,900/112,500, 88.0% base stability, and a melting point of 167.6° C. for the base stable fraction. The average (equilibrium) dioxolane concentration was 5.5 wt % and biproduct trioxane and trioxepane at the end of the reaction were 0.76 and 0.46 wt %.

Example 2

Into a rapidly stirred 250 ml reaction flask containing 85 g of heptane, 2.03 g (2.19 wt %) of dioxolane, 5.67 g (6.12 wt %) of nitromethane, the heptane being saturated at 39.7° C. with anhydrous formaldehyde, was added 17 microliters of borontrifluoride etherate. Dioxolane was then fed continuously at a rate of 0.10 g/min and formaldehyde on demand. The reaction exotherm peaked at 54.5° C. and formaldehyde was consumed at an average rate of 1.43 g/min (10.6 g/min/l) over a 10 min. period. The final copolymer contained 2.12 mole % of dioxolane derived units, an Mn/Mw ratio of 30,400/123,600, 87.1% base stability, and a melting point of 165.1° C. for the base stable fraction. Equilibrium dioxolane concentration was 1.0 wt % and biproduct trioxane and trioxepane at the end of the reaction were 0.73 and 1.0 wt %.

Comparative Example 2

The reaction was carried out, as in Example 2, except with 2.73 g (3.1 wt %) of acetontrile (in place of nitromethane) and 2.67 g (2.92 wt %) of initial dioxolane at 42.7° C. Formaldehyde was consumed at a rate of 0.88 g/min (6.32 g/min/l) and additional dioxolane was added at 0.24 g/min for 7.5 min (exotherm to 52.4° C.). The final copolymer contained 0.539 mole % of dioxolane derived units, had an Mn/Mw ratio of 15,800/30,100, 51.7% base stability, and a melting point of 163.4° C. for the base stable fraction. The equilibrium dioxolane concentration was 3.1 wt % and biproduct trioxane at the end of the reaction was 0.17 wt % (trioxepane—not detected).

Example 3

The reaction was carried out as in Example 2 except 3.76 g (4.17 wt %) of nitrobenzene with 7.6 ppm water was added in place of nitromethane. Dioxolane with 14.9 ppm water was added at 0.20 g/min and formaldehyde at 1.13 g/min (8.07 g/min/l) over a 9 min. period; exotherm was to 55.5° C. The final copolymer contained 1.175 mole % of dioxolane derived units, Mn/Mw=26,100/76,700, 83.2% base stability, and a melting point of 168.6° C. for the base stable fraction. Equilibrium dioxolane concentration was 1.16 wt % and biproduct trioxane and trioxepane at the end of the reaction were 2.25 and 0.40 wt %.

Example 4

The reaction was carried out as in Example 2 except 3.63 g (4.05 wt %) of 2-nitropropane with 1.4 ppm water was added in place of nitromethane. Dioxolane with 14.9 ppm water was added at 0.184 g/min and formaldehyde at 1.24 g/min (8.77 g/min/l) over a 9 min. period; exotherm was to 56.5° C. The final copolymer contained 0.672 mole % of dioxolane derived units, Mn/Mw=14,400/88,660, 67.8% base stability, and a melting point of 172.8° C. for the base stable fraction. Equilibrium dioxolane concentration was 1.29 wt % and biproduct trioxane at the end of the reaction was 1.48%. Trioxepane was not detected.

We claim:

1. A process for the copolymerization of anhydrous formaldehyde with cyclic ethers, comprising combining anhydrous formaldehyde with a slurry comprising particles of polyoxymethylene polymer or copolymer suspended in a hydrocarbon solvent having dissolved within it (I) one or more cyclic ethers in a concentration range of 0.05 to 1.0 molar; and (II) one or more organic nitro compounds in a concentration range of 0.06 to 1.2 molar, in the presence of a $BF_3$-etherate initiator.

2. The process of claim 1 wherein anhydrous formaldehyde having a maximum protonic impurity content of 600 ppm by volume is fed continuously into the process from a gas phase into the slurry.

3. The process of claim 1 wherein the anhydrous formaldehyde having a maximum protonic impurity content of 300 ppm by volume is fed continuously into the process from a gas phase into the slurry.

4. The process of claim 1 carried out at a temperature in the range of 30° C. to 80° C.

5. The process of claim 4 carried out at a temperature in the range of 50° C. to 70° C.

6. The process of claim 1 wherein (I) is dioxolane.

7. The process of claim 6 wherein the dioxolane concentration is 0.1 to 0.5 molar.

8. The process of claim 1 wherein the concentration range of organic nitro compound is 0.2–0.7M.

9. The process of claim 1 wherein (II) is nitromethane.

10. The process of claim 9 wherein the nitromethane concentration is about 0.2–0.7 molar.

11. The process of claim 1 wherein the initiator is $BF_3$-diethyl or $BF_3$-dibutyl etherate.

12. The process of claim 11 wherein the initiator concentration is 0.5–2 mM.

13. The process of claim 12 wherein the initiator concentration is 0.8–1.2 mM.

* * * * *